United States Patent [19]

Berry et al.

[11] Patent Number: 6,061,060

[45] Date of Patent: May 9, 2000

[54] DISPLAY SYSTEM WITH IMBEDDED ICONS IN A MENU BAR

[75] Inventors: Richard Edmond Berry, Georgetown, Tex.; Susan Faye Henshaw, Cary; David John Roberts, Raleigh, both of N.C.

[73] Assignee: International Business Machines Corporation, Armonk, N.Y.

[21] Appl. No.: 08/176,335

[22] Filed: Jan. 3, 1994

Related U.S. Application Data

[63] Continuation of application No. 07/888,221, May 26, 1992, abandoned.

[51] Int. Cl.[7] ....................................... G09G 5/14
[52] U.S. Cl. .................... 345/340; 345/347; 345/352; 345/348
[58] Field of Search ................... 345/156, 173, 345/179, 180, 182, 157, 119, 120, 115, 133, 146, 340, 347, 348, 349, 351, 352, 353, 354, 145; 359/159, 157

[56] References Cited

U.S. PATENT DOCUMENTS

| | | | |
|---|---|---|---|
| 4,068,304 | 1/1978 | Beausoleil et al. | 364/200 |
| 4,087,794 | 5/1978 | Beausoleil et al. | 364/900 |
| 4,635,208 | 1/1987 | Coleby et al. | 364/491 |
| 4,686,522 | 8/1987 | Hernandez et al. | 340/709 |
| 4,815,029 | 3/1989 | Barker et al. | 364/900 |
| 4,821,211 | 4/1989 | Torres | 364/521 |
| 4,843,538 | 6/1989 | Lane et al. | 364/188 |
| 4,853,843 | 8/1989 | Ecklund | 364/200 |
| 4,868,766 | 9/1989 | Oosterholt | 364/522 |
| 4,873,623 | 10/1989 | Lane et al. | 364/188 |
| 4,885,704 | 12/1989 | Takagi et al. | 345/166 |
| 4,885,717 | 12/1989 | Beck et al. | 364/900 |
| 4,899,136 | 2/1990 | Beard et al. | 340/706 |
| 4,933,514 | 6/1990 | Bowers | 178/18 |
| 4,939,507 | 7/1990 | Beard et al. | 340/706 |
| 4,945,475 | 7/1990 | Bruffey et al. | 364/200 |
| 4,951,190 | 8/1990 | Lane et al. | 364/188 |
| 4,953,080 | 8/1990 | Dysart et al. | 364/200 |
| 4,984,152 | 1/1991 | Muller | 345/157 |
| 4,989,132 | 1/1991 | Mellender et al. | 364/200 |
| 4,996,654 | 2/1991 | Rosenow | 364/521 |
| 5,001,697 | 3/1991 | Torres | 364/521 |
| 5,040,131 | 8/1991 | Torres | 364/521 |
| 5,041,967 | 8/1991 | Ephrath et al. | 364/200 |
| 5,041,982 | 8/1991 | Rathnam | 364/443 |
| 5,140,677 | 8/1992 | Fleming et al. | 395/157 |
| 5,140,678 | 8/1992 | Torres | 395/157 |
| 5,202,828 | 4/1993 | Vertelney et al. | 395/159 |
| 5,241,655 | 8/1993 | Mineki et al. | 395/159 |
| 5,295,062 | 3/1994 | Fukushima | 345/173 |
| 5,317,687 | 5/1994 | Torres | 395/159 |

OTHER PUBLICATIONS

Lisa Draw, Published in U.S.A. by Apple Computer Inc. 1983.

*Primary Examiner*—Lun-Yi Lao
*Attorney, Agent, or Firm*—Mark S. Walker; Andrew J. Dillon

[57] ABSTRACT

A method, system and program for including selections in the menu bar that are icons. The support for menus containing icons includes an algorithm in the memory of a processor that presents a menu bar with imbedded icons. The icons can be selected and directly manipulated to perform operations associated with the particular icon upon another icon or other object on a display.

9 Claims, 16 Drawing Sheets

Pseudo-Program Logic

```
while not commandQuit do                    /-10
   case userMouseClick on                   /-12
      menuBarIcon:                          /-13
         case userMouseClick on             /-20
            menuBarObjectIcon:              /-22
               displayPopUpMenuFor(objectInWindow);  /-24
            menuBarSelectedIcon:
               displayPopUpMenuFor(selectedObject);  /-28
            menuBarWindowIcon:                       ~-30
 40~           displayPopUpMenuFor(windowObject);    ~-32
     ~menuBarHelpIcon:
 42~       displayPopUpMenuFor(helpObject);
         end;
      currentSelectedObject:
 44~     displayPopUpMenuFor(selectedObject);  ~-50
      ...
      else
         {handle clicks on other objects}
      end;
end;
```

FIG. 1B

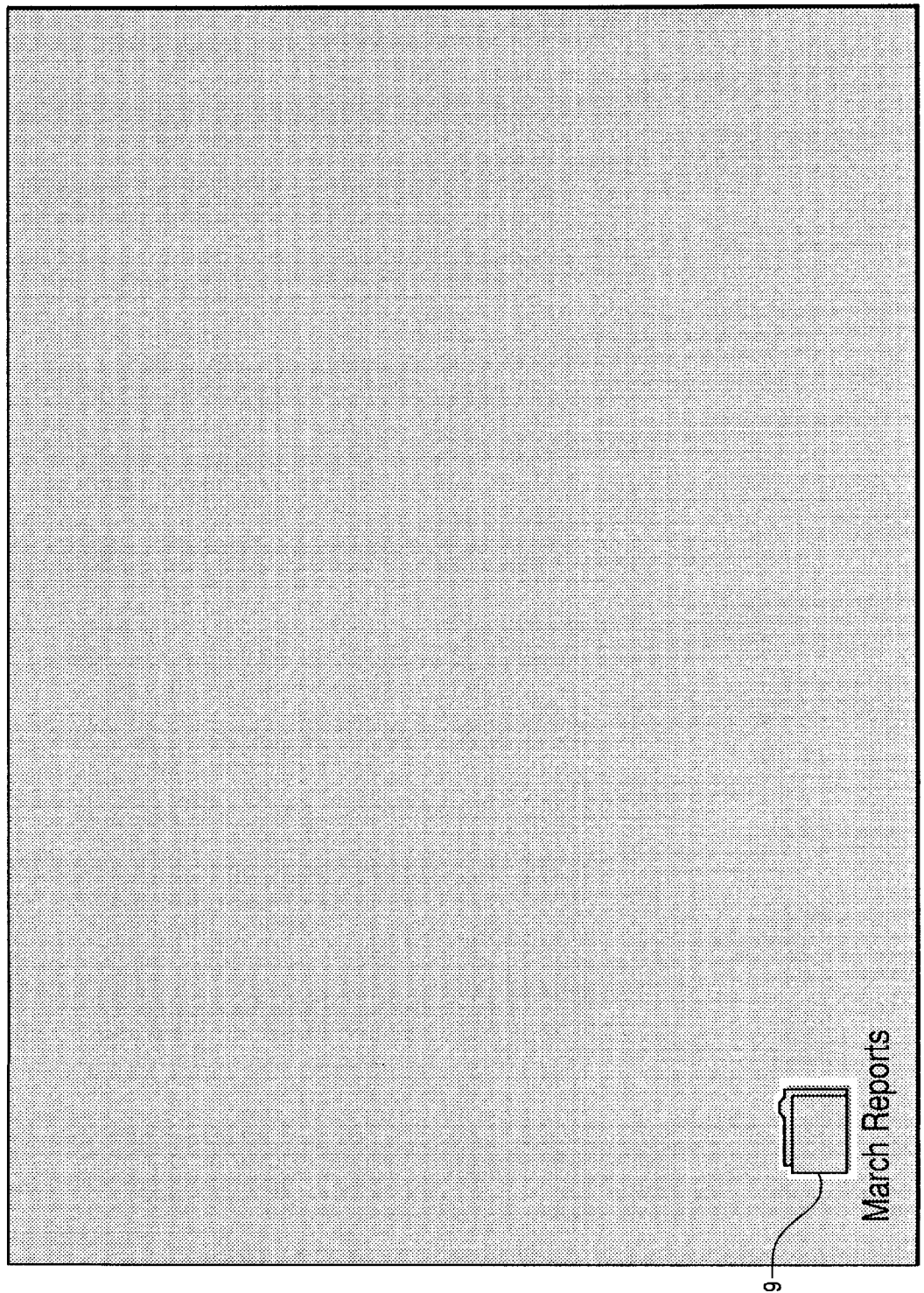

DISPLAY SYSTEM WITH IMBEDDED ICONS IN A MENU BAR

This is a continuation of application Ser. No. 07/888,221 filed May 26, 1992, now abandoned.

FIELD OF THE INVENTION

This invention generally relates to improvements in display systems and more particularly to menu bar selection processing.

CROSS REFERENCE TO RELATED APPLICATIONS

Subject matter in the present application is related to the invention in U.S. patent application AT9-92-040; Ser. No. 07/888,223 filed Apr. 8, 1992 under the title "DISPLAY SYSTEM WITH NESTED OBJECTS".

BACKGROUND OF THE INVENTION

Currently, graphical user interfaces present menu choices to a user using a combination of a menu bar and pull-down menus. An example of this technique is found in U.S. Pat. No. 4,772,882 which discloses menu item selection in a personal computer system through the use of a mouse device. The display system has means for allowing a user to invoke a header block which performs the function of a menu bar, and to erase the header block from the screen when menu operations are not required. Multiple menu items can be selected during the same menu session by using a pair of mouse buttons to generate a sequence of selection commands.

The menu bar, first popularized by Xerox and Apple in the early 1980s is typically a horizontal row of choices across the top of the display screen or across the top of a particular window on the display. A pull-down menu appears below a menu bar choice when a user selects a choice. The menu bar choices are represented by words such as FILE, EDIT, VIEW, OPTIONS, HELP and so forth.

Several of these interfaces represent objects as icons and allow a user to perform actions on a particular object by dragging its associated icon via a mouse, or by selecting choices from the menu bar and pull-down menus. U.S. Pat. No. 4,899,136 discloses a multiprocessor system with a user interface in the form of metaphoric objects, called icons, with which the user can interact by changing the input focus to a designated object by visually pointing to it via the input means, which thereafter permits manipulation of the designated object or interaction with data input/output relative to the designated object.

However, these interfaces provide little direct correlation between dragging actions and actions accomplished via the menus. They are treated as two separate and independent mechanisms. Users can become confused about the relationships of actions performed via the menus and via the dragging of the icons.

Microsoft has attempted to address some of the user's requirements for user selection of menu commands by providing a separate line of button commands that are referred to as a toolbar. The toolbar is located under the menu bar. However, the graphical representations cannot be dragged or otherwise manipulated by a user with the same degree of freedom as an icon. Finally, the button commands cannot be incorporated into the menu bar by the user.

The prior art is void of direct correlation between the group of choices in a pull-down menu and an object. Current menu-bar interface actions which affect a particular object are typically spread across multiple pull-down menus, and other actions may apply to two or more objects. Thus, users can become confused concerning which object that may be affected by a particular choice.

SUMMARY OF THE INVENTION

Accordingly, it is a primary objective of the present invention to include selections on the menu bar that are icons.

These and other objectives of the present invention are accomplished by the operation of an algorithm in the memory of a processor that provides for presenting a menu bar with imbedded icons. The icons can be selected and directly manipulated to perform operations associated with the particular icon upon another icon or other object on a display.

BRIEF DESCRIPTION OF THE DRAWINGS

FIG. 1B is a listing of pseudo code that sets forth the logic flow in accordance with the subject invention;

FIG. 1D is a display showing an initial folder in accordance with the subject invention;

DETAILED DESCRIPTION OF THE INVENTION

Figure 1A:
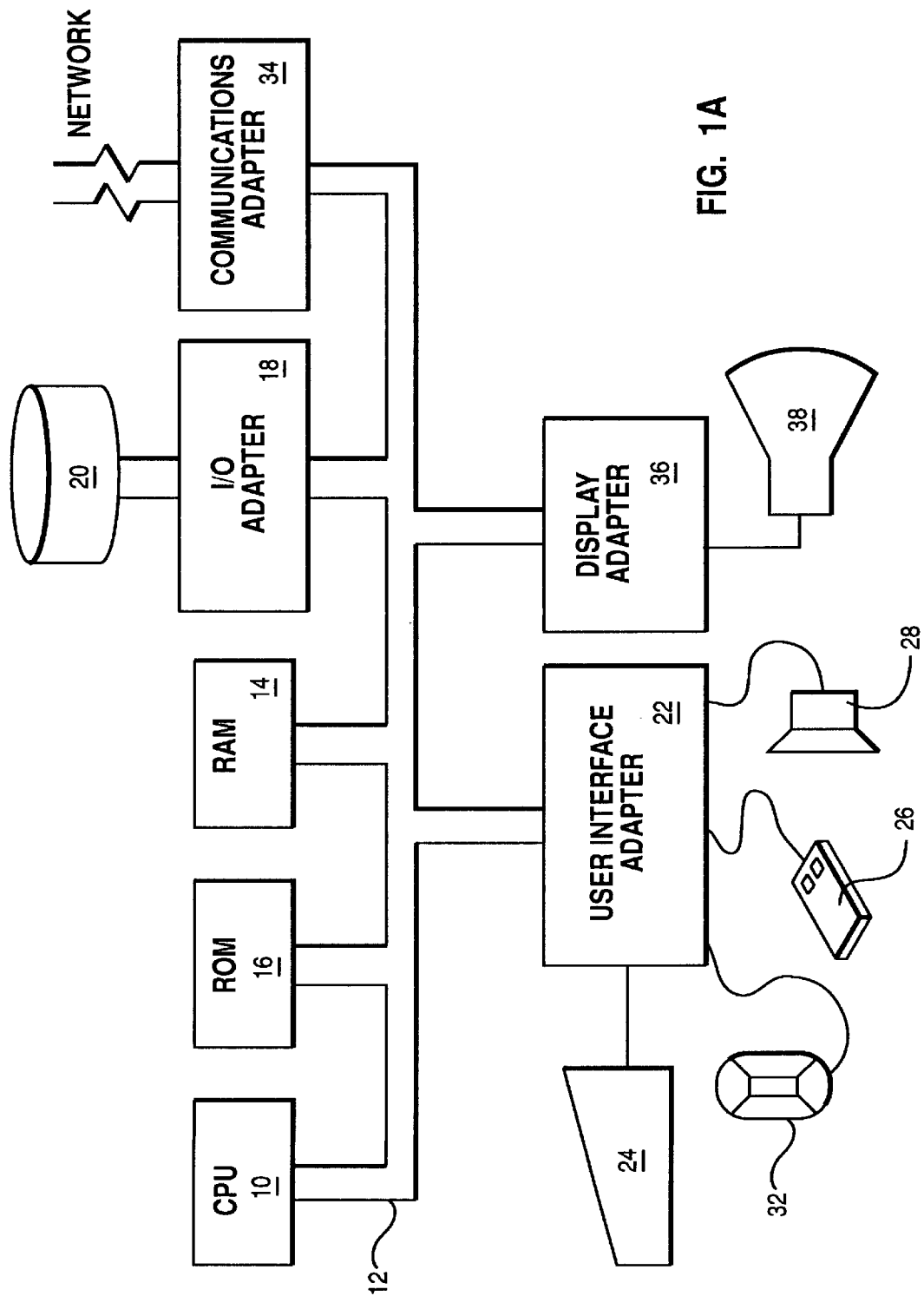
FIG. 1A is a block diagram of a personal computer system in accordance with the subject invention.

The invention is preferably practiced in a representative hardware environment as depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read only Memory (ROM) 16, an I/O adapter 18 for connecting peripheral devices such as disk units 20 and tape drives 40 to the bus, a user interface adapter 22 for connecting a keyboard 24, a mouse 25, a speaker 28, a microphone 32, and/or other user interface devices such as a touch screen device (not shown) to the bus, a communication adapter 23 for connecting the workstation to a data processing network and a display adapter 29 for connecting the bus to a display device 27.

The invention is a method and system for displaying a menu bar with imbedded icons on the menu bar on a display device 27. The use of icons as part of the menu bar choices clearly identifies the object upon which actions are to be performed.

Icons can be dragged to accomplish actions in exactly the same manner as icons are used in other areas of the desktop motif. For example, dragging the icon of a document to a printer icon results in a print operation generating a paper version of the document. The invention allows users to drag icons from the menu bar to a printer icon with the same effect.

The invention provides a direct correlation between the dragging action and menu bar actions. Dragging actions on a particular icon perform actions that are listed as choices in an icon's associated pull-down menu. Thus, the dragging actions can then be thought of as simple short-cuts for corresponding menu choices.

The invention allows an icon to serve as a convenient handle for an object or group of objects that would otherwise be more difficult to manipulate. For example, when users select several objects in a window at the same time it is non-intuitive and confusing when the group of objects are dragged by one of the members of the group. Furthermore, the window may have been scrolled so that none of the selected objects are visible.

An icon in a menu represents a selected group regardless of how many selections are associated with the icon. Direct manipulation of the group is performed conveniently by simply dragging the menu bar icon that represents the selection group. Similarly, an icon from which a window is first opened is often covered by the window. The menu bar icon that represents the object is equivalent to the icon from which the window was opened, and the icon provides a convenient way to perform direct manipulation on the object displayed in the window. Thus, the use of icons as menu bar selections simplifies and enhances the interface of a user to a display system.

DETAILED LOGIC

FIG. 1B is a listing of pseudo-program logic in accordance with the subject invention. As user input events occur, the events are trapped in a while loop at 30, and mouse events are analyzed at 31. Mouse events on the menu bar involving icons 32 are routed to the appropriate object 33, 35, 37 and 40 depending on the position of the mouse pointer on the display. Each object handles the mouse event by displaying the pop up menu associated with the object as shown at 34, 36, 38 and 42.

Mouse events associated with a pointer on the current selected object in a window 44 are routed to that object for display of the associated pop up menu 50. This logic is performed recursively for each set of objects and at each level of a nested object hierarchy. Thus, a call to a particular routine may result in another call to the same routine to complete the processing.

Figure 1C:
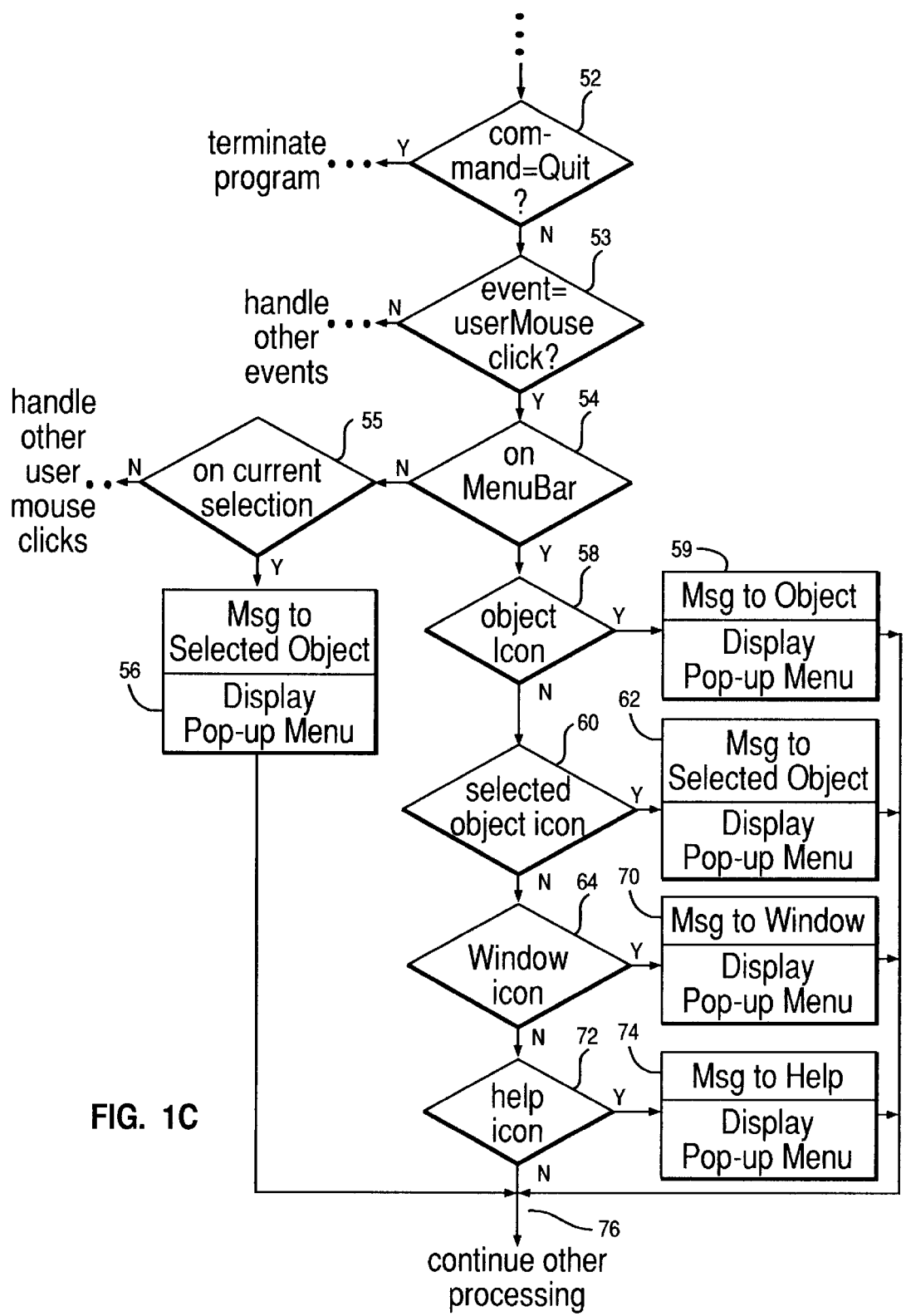
FIG. 1C is a flow chart that sets forth the logic flow in accordance with the subject invention.

FIG. 1C is a flow chart that sets forth the logic flow in accordance with the subject invention. Processing commences at decision block 52 when a program detects a selection. At decision block 52, a test is performed to determine if a user has requested program termination. If the user has asked to terminate the program, then processing is finished. If not, then further testing is performed at decision block 53 to determine if a mouse click event has been detected. If the event is not a mouse click, then other processing irrelevant to the subject invention is performed.

If the event is a mouse event, then a test is performed at decision block 54 to determine if the mouse was clicked on the menu bar. If the mouse click is not made on the menu bar, then another test is performed at decision block 55 to determine if the selection is on a current selection. If the click was detected on a non-current selection, then processing is passed to other logic irrelevant to the subject invention. However, if the click was in a current selection, then a pop up menu associated with the current selection is displayed as shown in function block 56 and control is passed to label 76 to continue other processing.

If the mouse was clicked on the menu bar, then control is passed to decision block 58 to determine if the icon is the icon that was opened to display the window. If so, then a pop up menu associated with the object icon is displayed as shown in function block 59 and control is passed to label 76 to continue processing.

If the icon was not the object icon, then another test is performed at decision block 60 to determine if the one icon represents the group of selected objects in this window. If so, then a pop up menu associated with the selected object is displayed at function block 62 and control is passed to label 76 to continue processing.

If the icon was not the selected object icon, then a further test is performed at decision block 64 to detect if the window icon has been clicked on. If so, then a pop up menu associated with the window icon is presented to the user as shown at function block 70 and control is passed to label 76 to continue processing.

If the icon was not the window icon, then a final test is performed at decision block 72 to determine if a help icon has been clicked upon. If so, then an associated pop up menu is presented at function block 74 and control is passed to label 76 to continue processing. If not a help icon, then processing is continued at label 76.

Figure 2:
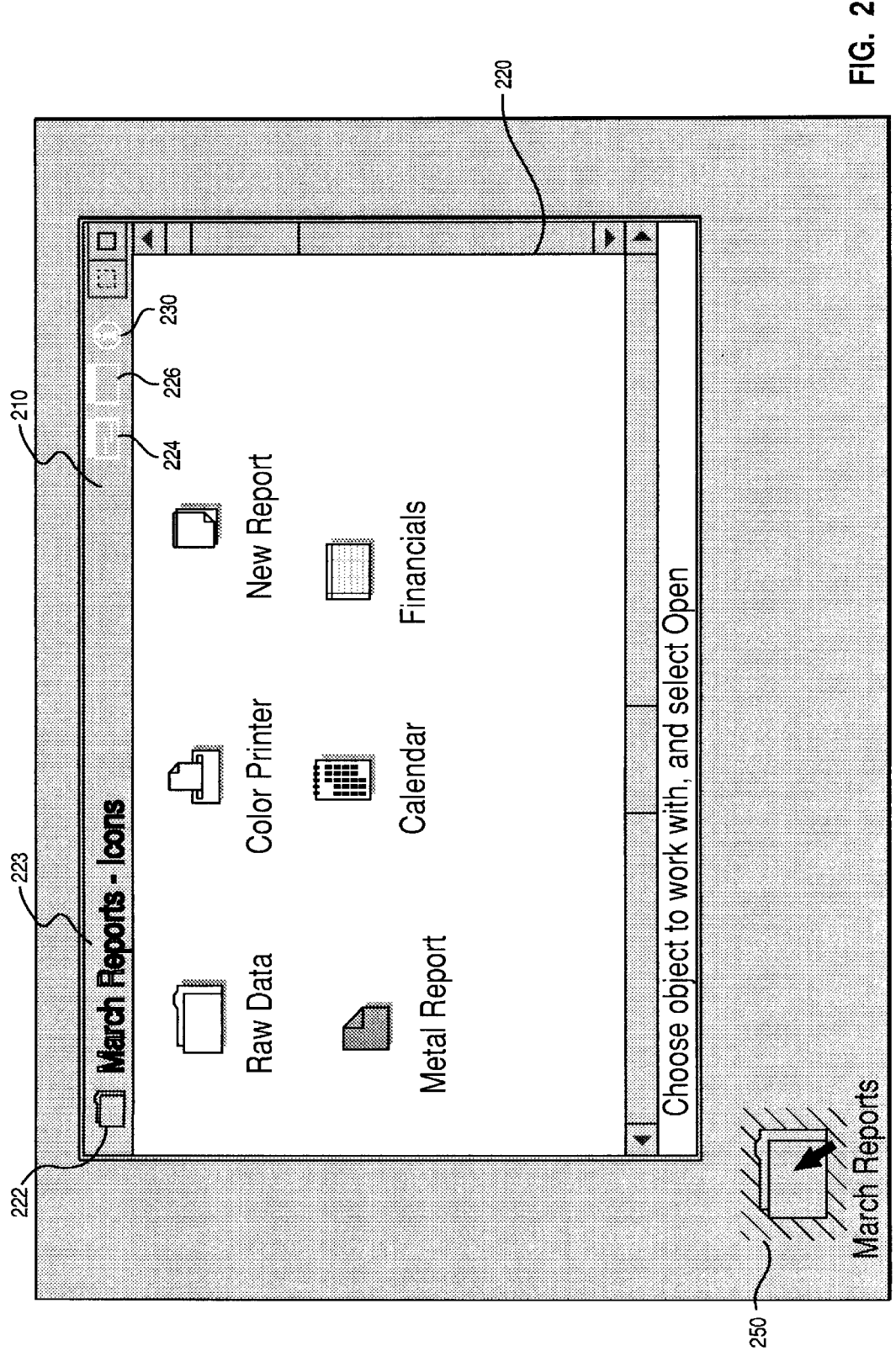
FIG. 2 is an illustration of a display with a window with the contents of a folder displayed in accordance with the subject invention.

FIG. 1D is a display showing an initial folder 99 in accordance with the subject invention. The folder's contents are subsequently opened in FIG. 2 by a user desiring access to the contents. The menu bar 210 and title bar for the window 220 are combined in this example. One of ordinary skill in the art will realize that they could be separate lines of a window. The content of the menu bar 210 is: a folder icon representing the March Reports Folder 222; a title of the folder and type of view (March Reports—Icons) 223; an icon representing an object selected in the window 224 (none selected in this example); an icon representative of the window 226; and an icon representing a Help object (information (i)) 230. The two remaining symbols on the menu bar are buttons for sizing the window and are ancillary to the subject invention. The stripes behind the March Reports icon 250 on the desktop display indicate that a window is currently open on this object.

Figure 3:
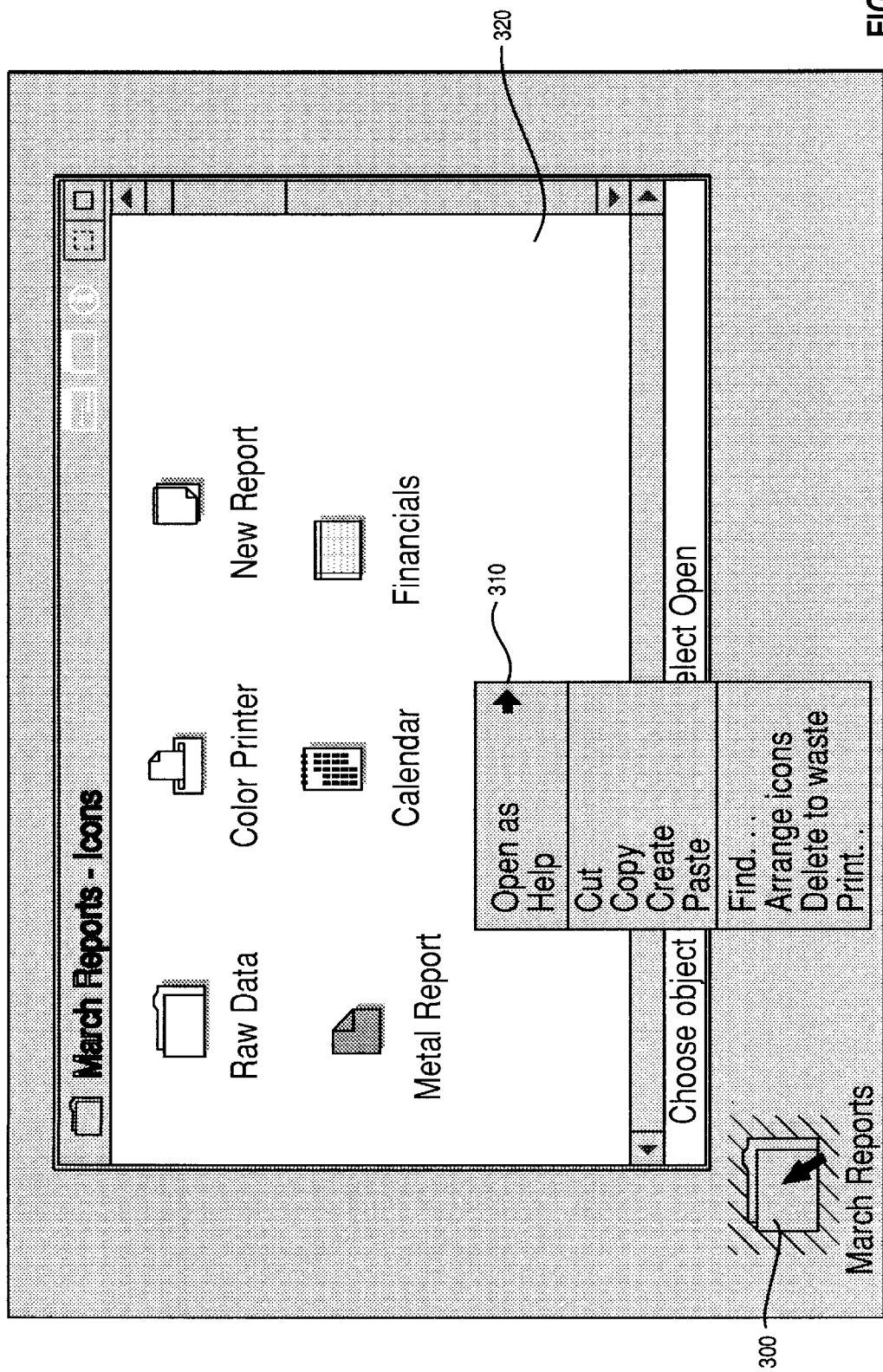
FIG. 3 is an illustration of a display with a set of selections available for a particular icon in accordance with the subject invention.

FIG. 3 is an illustration of a display with a set of selections available for a particular icon in accordance with the subject invention. When a user clicks a mouse button on the mouse with the cursor pointer 300 located over the folder icon on the desktop, a pop up menu 310 for the folder is displayed overlaying the desktop information 320. This menu is typically unique to the object it is associated with.

Figure 4:
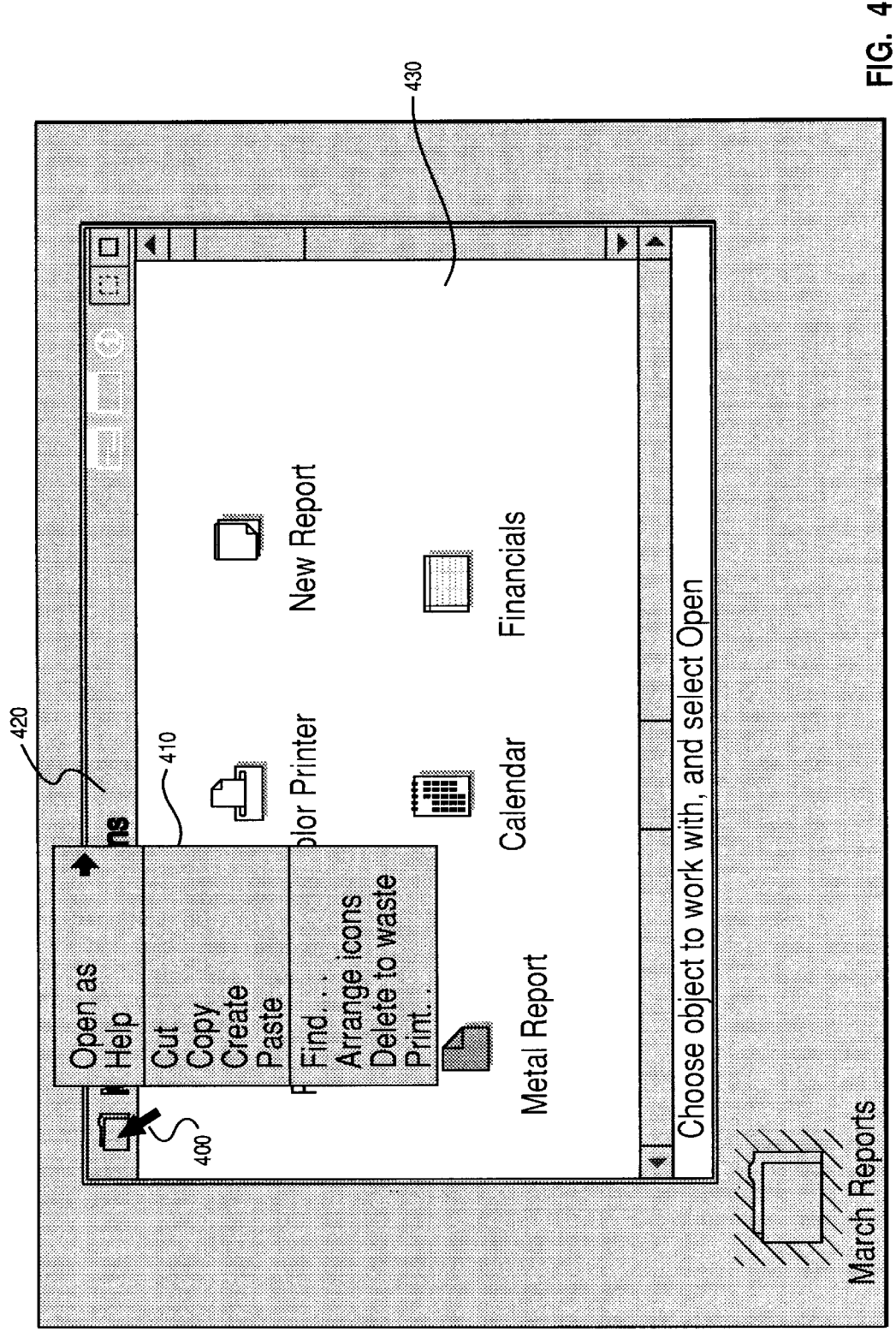
FIG. 4 is an illustration of a display with a set of selections available for a particular icon in a menu bar in accordance with the subject invention.

FIG. 4 is an illustration of a display with a set of selections available for a particular icon in a menu bar in accordance with the subject invention. If a user clicks a menu button on the mouse while the cursor pointer 400 is over a folder icon in the menu bar 420 of the display 430, an associated pop up menu is displayed as shown at 410.

Figure 5:
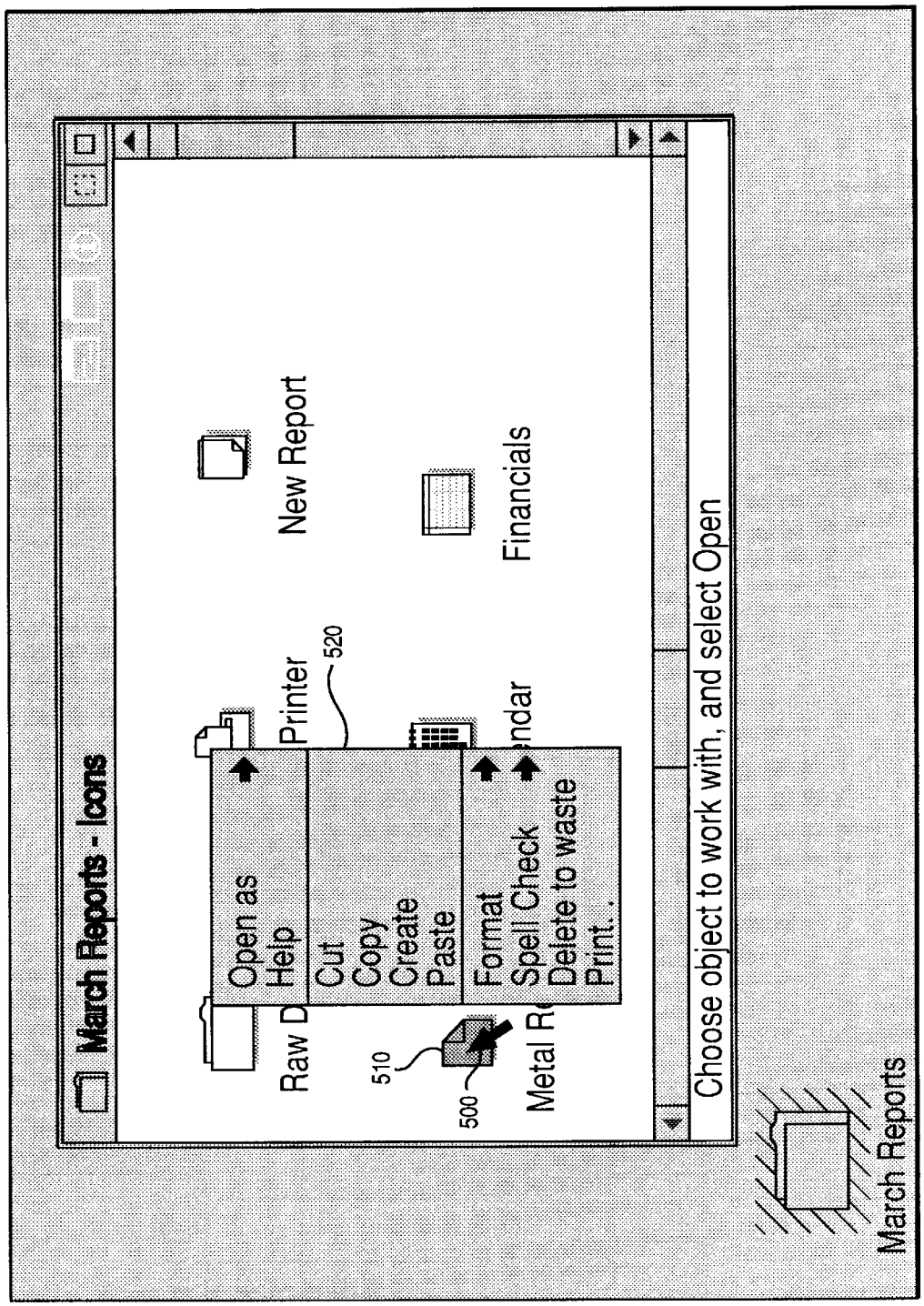
FIG. 5 is an illustration of a display with a set of selections available for a particular icon in accordance with the subject invention.

FIG. 5 is an illustration of a display with a set of selections available for a particular icon in accordance with the subject invention. If a user clicks the menu button on the mouse when the cursor pointer 500 is over a report document icon 510, an associated pop up menu is displayed as shown at 520.

Figure 6:
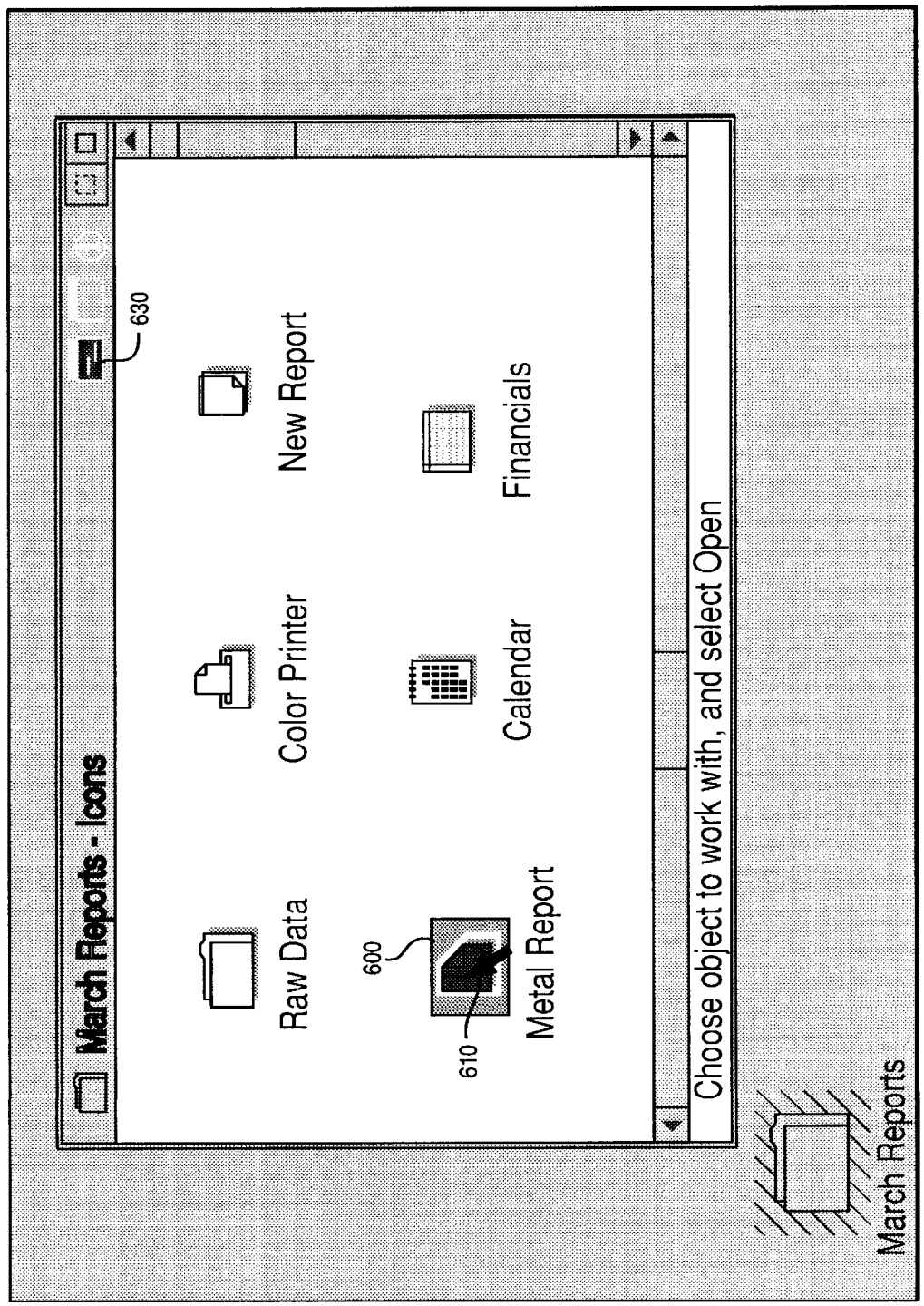
FIG. 6 is an illustration of a display with a particular icon selected in accordance with the subject invention.

FIG. 6 is an illustration of a display with a particular icon selected in accordance with the subject invention. The report icon 600 is selected by positioning the cursor pointer 610 over the report icon and clicking the mouse button. This selection process associated the selected icon object 630 in the menu bar with the report that was selected.

Figure 7:
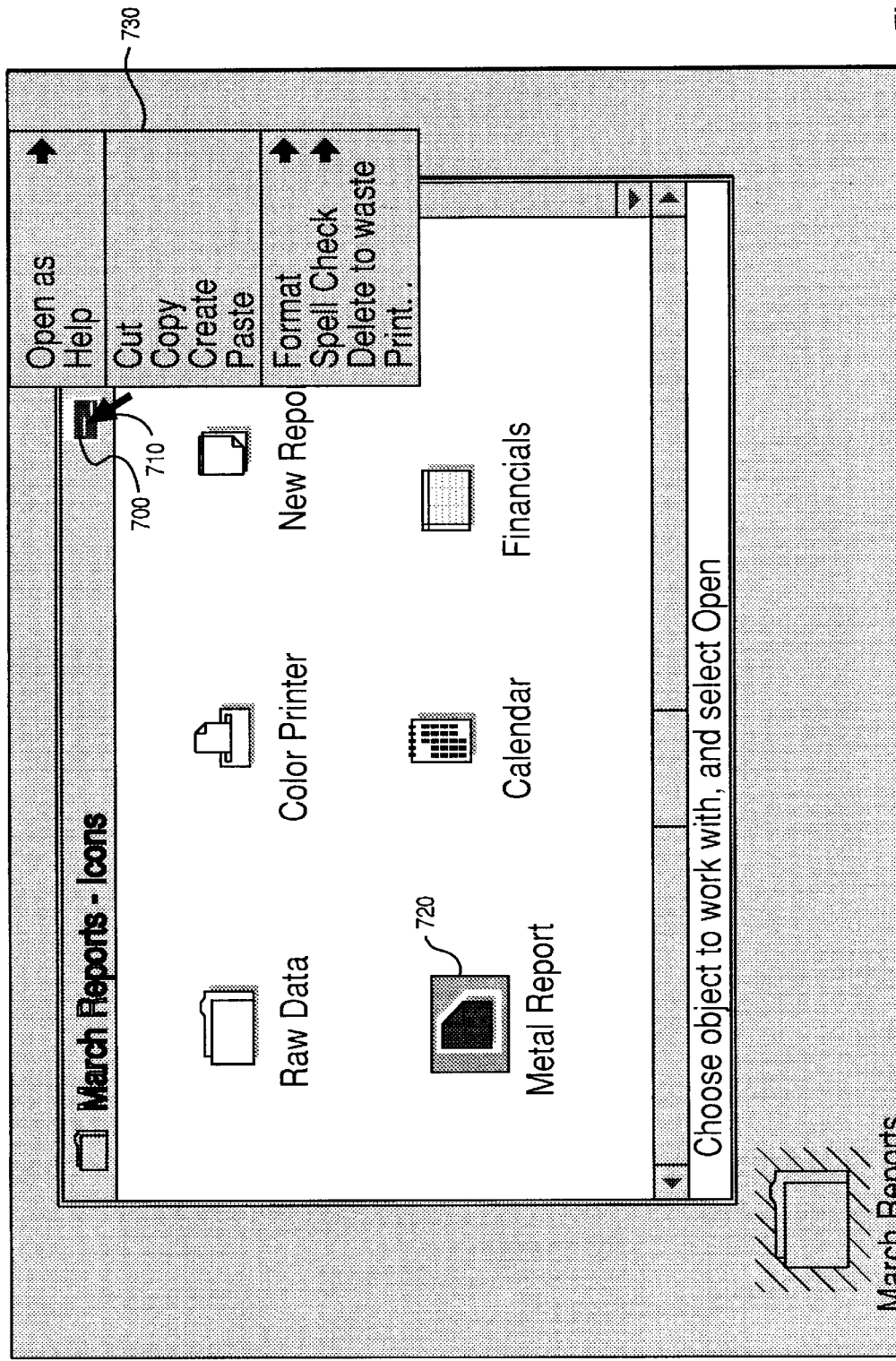
FIG. 7 is an illustration of a display with a particular icon in the menu bar selected and the selection choices for the icon presented in accordance with the subject invention.

FIG. 7 is an illustration of a display with a particular icon in the menu bar selected and the selection choices for the icon presented in accordance with the subject invention. Since the selected icon 700 in the menu bar is associated with the report icon 720, when a user clicks the menu button of the mouse while the cursor arrow 710 is positioned over the selected object icon, the same pop up menu 730 is displayed as in FIG. 5.

Figure 8:
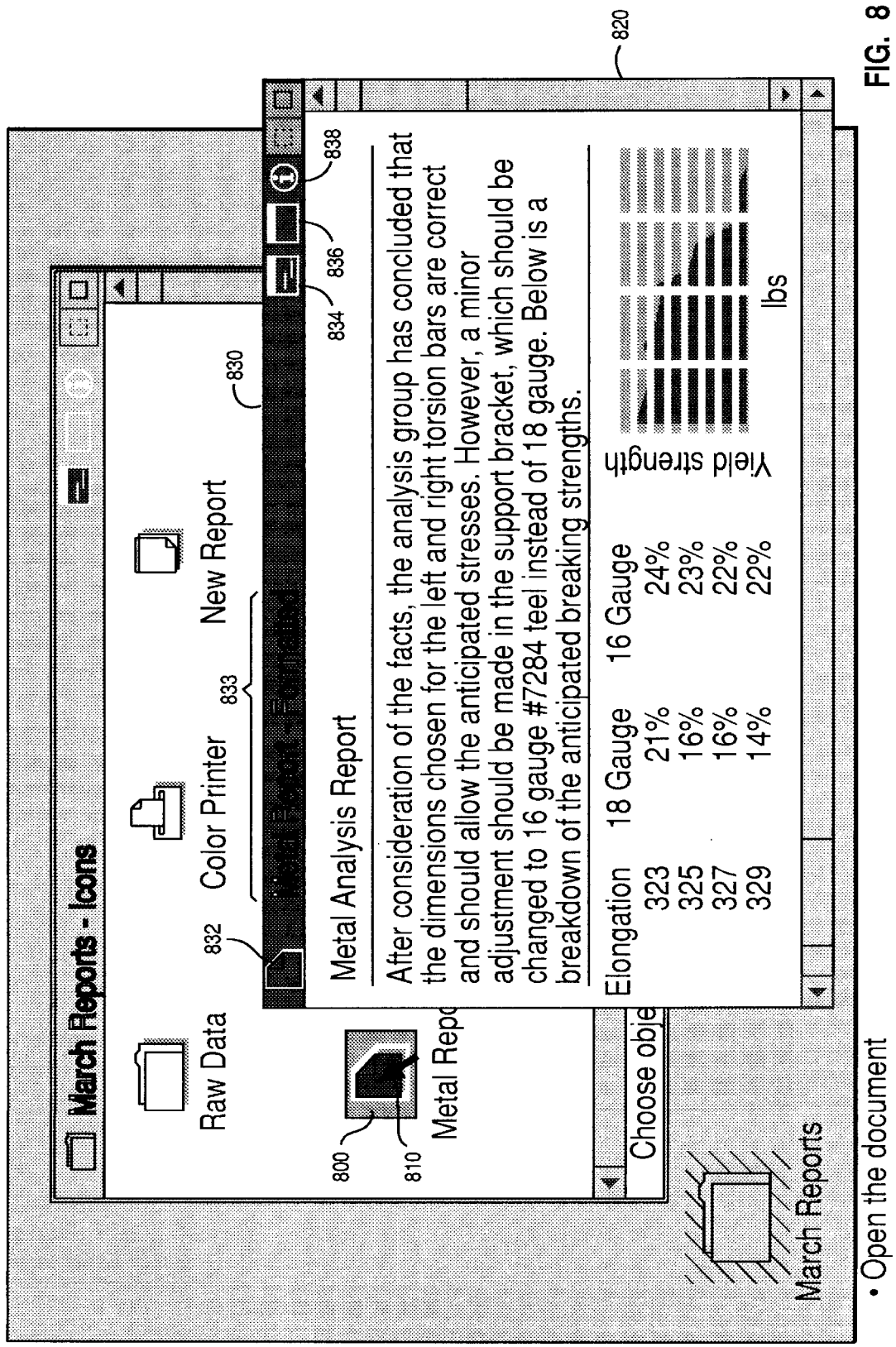
FIG. 8 is an illustration of a display with a particular icon's associated document opened in accordance with the subject invention.

FIG. 8 is an illustration of a display with a particular icon's associated document opened in accordance with the subject invention. If a user opens a window by positioning the cursor arrow 810 over the report icon 800 and pressing the mouse button, a window 820 containing the report is presented to the user. Note that the new window 820 has a menu bar 830 with information associated with the report icon. The content of the new menu bar 830 is: a document icon 832 associated with the report icon 800; the title information 833; an icon representing a selected object 834 (none currently selected); an icon representing the new window 836; and an icon representative of a help function 838.

Figure 9:
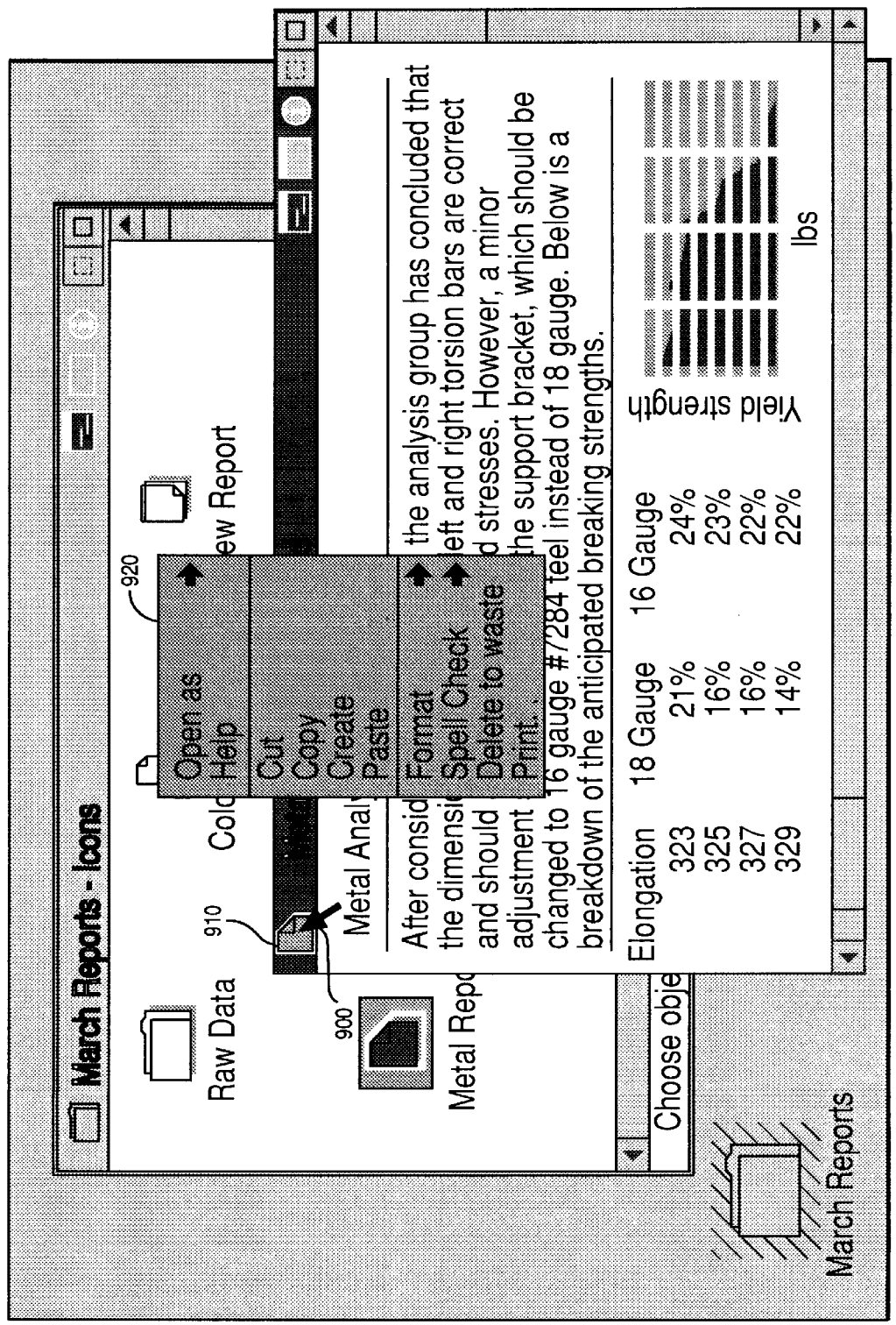
FIG. 9 is an illustration of a display with a particular document's pop up display invoked by selection from a menu icon in accordance with the subject invention.

FIG. 9 is an illustration of a display with a particular document's pop up display invoked by selection from a menu icon in accordance with the subject invention. If a user presses the menu button while the arrow cursor 900 is positioned over the report icon in the title bar 910, a pop up menu 920 associated with the report is displayed.

Figure 10:
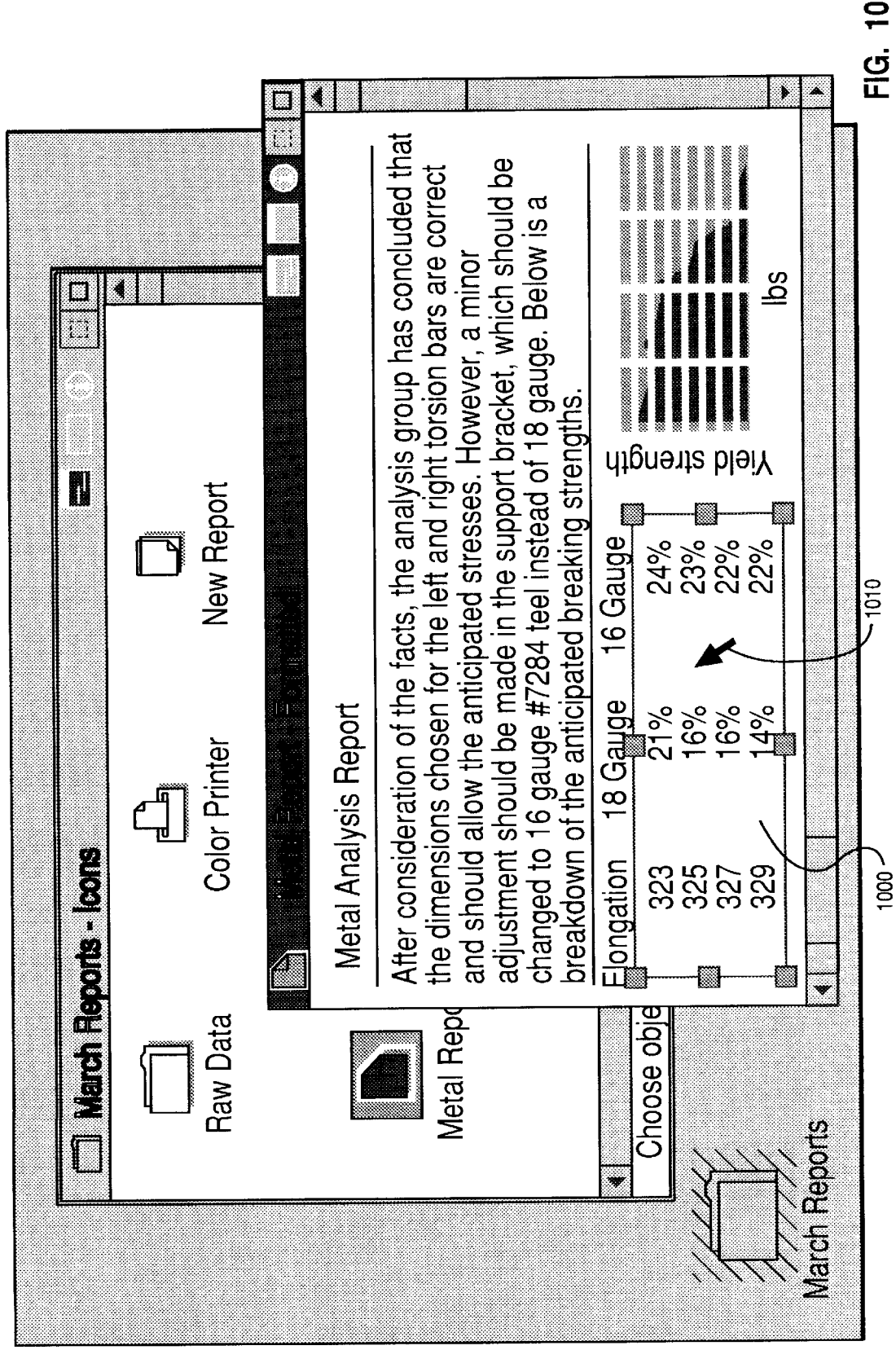
FIG. 10 is an illustration of a display with a particular table selected in accordance with the subject invention.

FIG. 10 is an illustration of a display with a particular table selected in accordance with the subject invention. If a user clicks the select button on the mouse when the arrow cursor 1010 is over a table 1000, the table is selected.

Figure 11:
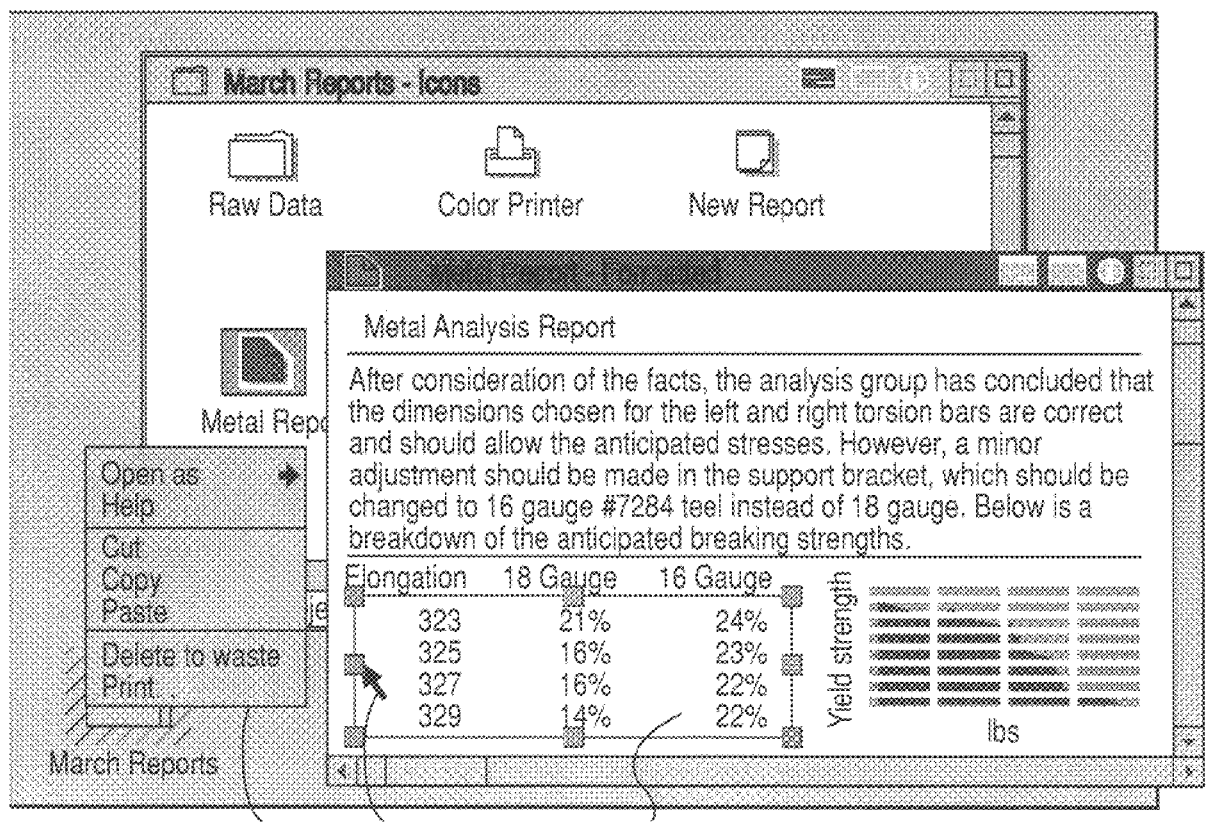
FIG. 11 is an illustration of a pop up menu associated with a particular table in accordance with the subject invention.

FIG. 11 is an illustration of a pop up menu associated with a particular table in accordance with the subject invention. If a user clicks the menu button while the cursor arrow 1100 is over the table 1110, a pop up menu 1120 is displayed.

Figure 12:
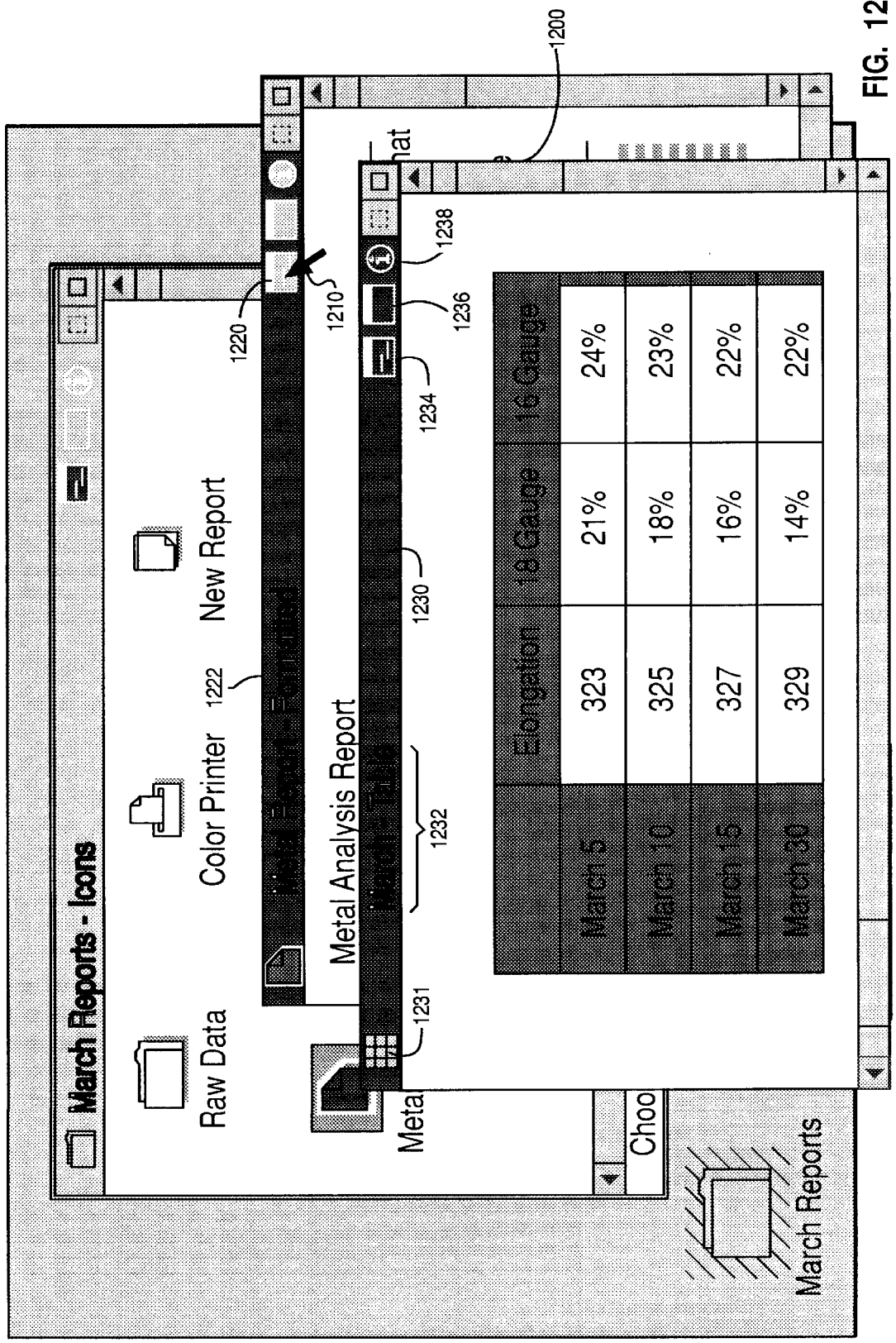
FIG. 12 is an illustration of a direct invocation of a table from a particular selection and menu in accordance with the subject invention.

FIG. 12 is an illustration of a direct invocation of a table from a particular menu icon in accordance with the subject invention. A user opens a window 1200 by positioning the arrow cursor 1210 over the icon representing the selected table object 1220 of the menu bar 1222 and pressing the menu button. Another menu bar 1230 is created and displayed in the window 1200. The new menu bar 1230 has contents associated with the table, comprising: a table icon representing the table 1231, a title (March—Table) 1232, an icon representing an object or objects selected in the window (none are currently selected) 1234, an icon representing the window 1236, and an icon representing the help object 1238.

Figure 13:
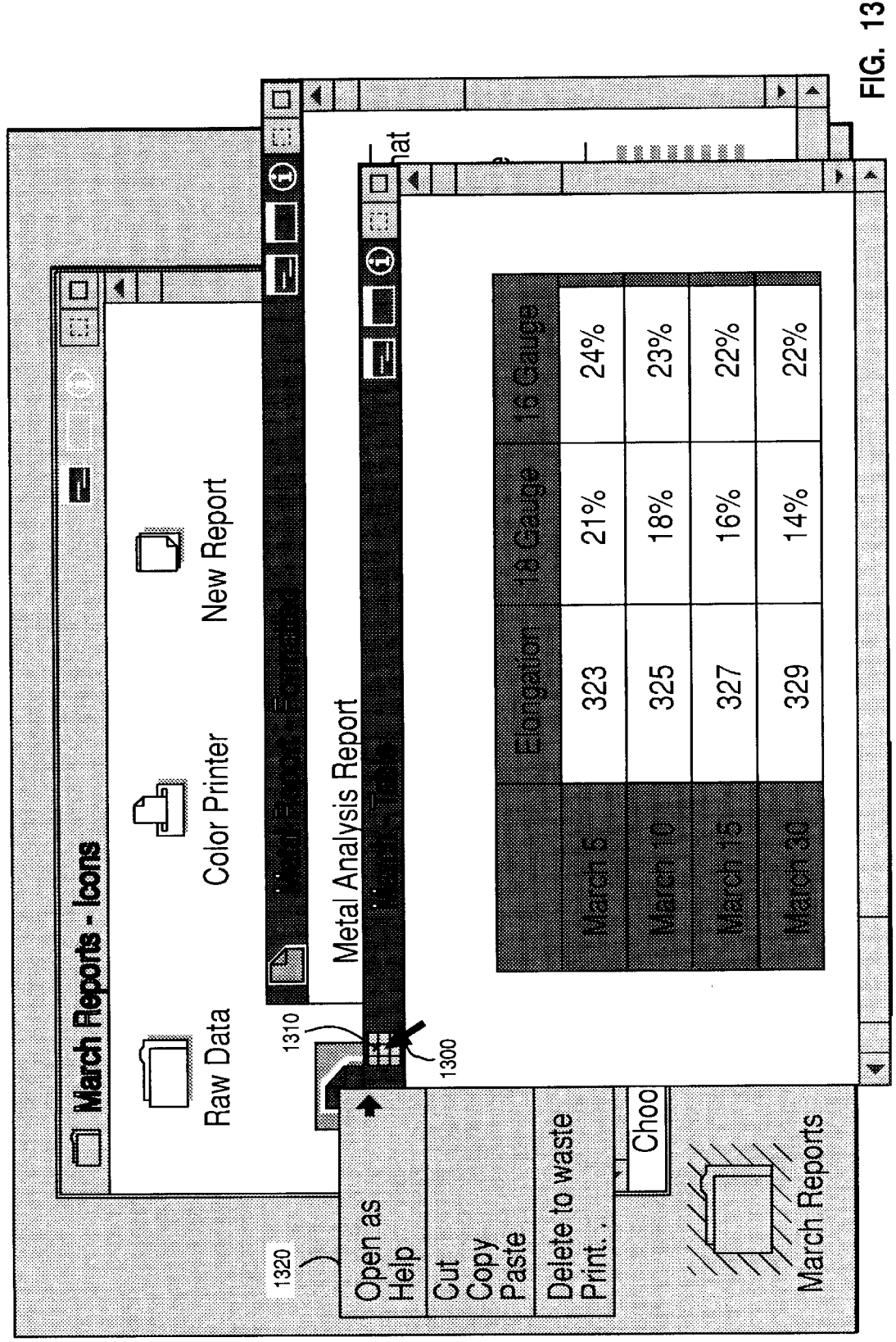
FIG. 13 is an illustration of a display with a pop up menu associated with a particular icon in a report in accordance with the subject invention.

FIG. 13 is an illustration of a display with a pop up menu associated with a menu icon in a report in accordance with the subject invention. If a user presses the mouse button while the arrow cursor 1300 is positioned over the report icon 1310, then a pop up window 1320 appears on the display.

It should be clear to one of ordinary skill in the art that such nesting of windows could continue indefinitely to the cells and headings of the table, and the contents of each cell depending on the composition of the objects involved.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. An apparatus for operating a user interface having one or more icons in a menu bar of a window on a display, comprising:

(a) means for producing a menu bar in a window on the display;

(b) means for placing a plurality of menu bar icons in the menu bar;

(c) means for associating at least one actionable object in said window with each of said plurality of menu bar icons, each of said actionable objects displayed within said window and represented by a different menu bar icon within said menu bar, said actionable objects having data and procedural information and being operable independent of said associated menu bar icon; and (d) means for sending a selection message to said at least one associated actionable object in response to operator selection of one of said plurality of menu bar icons which requests presentation of an object associated pop-up menu on the display such that multiple diverse sets of object associated pop-up menus may be efficiently invoked.

2. An apparatus as recited in claim 1, including means for dragging one of the plurality of menu bar icons to accomplish specific actions associated with the associated actionable objects.

3. An apparatus as recited in claim 2, including means for dropping one of the plurality of menu bar icons onto another object on the display to invoke a specific action on the other object.

4. A method for operating a user interface having one or more icons in a menu bar of a window on a display, comprising the steps of:

(a) producing a menu bar in a window on the display;

(b) placing a plurality of menu bar icons in the menu bar of the display;

(c) associating at least one actionable object in said window with each of said plurality of menu bar icons each of said actionable objects displayed within said window and represented by a different menu bar icon within said menu bar, each of said actionable objects having data and procedural information and being operable independent of said associated menu bar icon; and (d) sending a selection message to said at least one associated actionable object in response to operator selection of one of said plurality of menu bar icons which requests presentation of an object associated pop-up menu on the display such that multiple diverse sets of objects associated pop-up menus may be efficiently invoked.

5. A method as recited in claim 4, including the step of dragging one of the plurality of menu bar icons in the menu bar to accomplish specific actions associated with the one or more associated actionable objects.

6. A method as recited in claim 5, including the step of dropping one of the plurality of menu bar icons onto another object on the display to invoke a specific action on the other object.

7. A computer program for execution with a computer system having a central processing unit and display adapter for operating on information including one or more icons in a menu bar of a window on a display, comprising:

(a) means for producing a menu bar in a window on the display;

(b) means for placing a plurality of menu bar icons in the menu bar;

(c) means for associating at least one actionable object in said window with each of said plurality of menu bar icons each of said actionable objects displayed within said window and represented by a different menu bar icon within said menu bar, each of said actionable objects having data and procedural information and being operable independent of said associated icon in said menu bar; and (d) means for sending a selection message to said at least one associated actionable object in response to operator selection of one of said plurality of menu bar icons which requests presentation of an object associated pop-up menu on the display such that multiple diverse sets of object associated pop-up menus may be efficiently invoked.

8. A computer program as recited in claim 7, including means for dragging one of the plurality of menu bar icons to accomplish specific actions associated with the one or more associated actionable objects.

9. A computer program as recited in claim 7, including means for dropping one of the plurality of menu bar icons onto another object on the display to invoke a specific action on the other object.

* * * * *